Oct. 6, 1936.  D. L. HAY  2,056,187
SPECIFIC GRAVITY INDICATOR
Filed Aug. 15, 1934
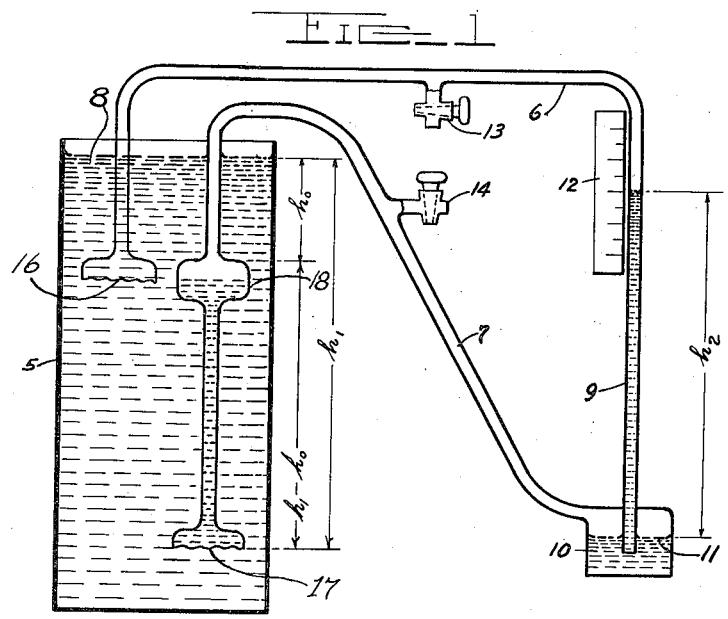
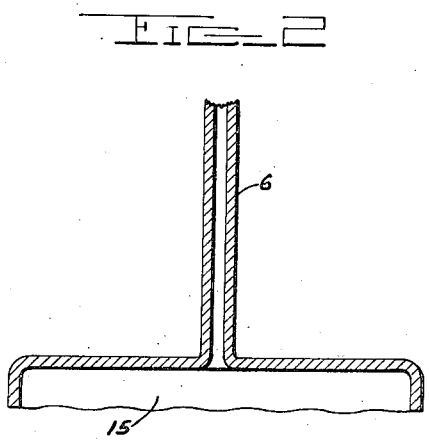
INVENTOR
Donald L. Hay
BY
Harold Dodd
ATTORNEY Patented Oct. 6, 1936

2,056,187

UNITED STATES PATENT OFFICE 2,056,187

SPECIFIC GRAVITY INDICATOR

Donald L. Hay, Washington, D. C.

Application August 15, 1934, Serial No. 739,890

1 Claim. (Cl. 265—44)

(Granted under the act of March 3, 1883, as amended April 30, 1928; 370 O. G. 757)

This invention relates broadly to a measuring instrument and has particular reference to a means or apparatus for indicating the density of fluent materials.

It frequently happens that the fluid, whose density is being ascertained, is not of uniform density throughout the container. Under these conditions a density measurement made on a sample removed from one point in the container, such as the upper surface of the fluid, will not be representative of the mean density throughout the container.

As an illustration, consider the measurement of the density of the electrolyte in a storage battery cell. The usual method of testing a sample removed from the space above the plates is more or less inaccurate, unless the cell is gassing. The presence of the plates in the cell prevents free circulation and mixing of the liquid, and consequently local densities, due to the addition of water or the charging or discharging of the cell, are not eliminated. It is well known that after water has been added, a cell must be charged until it gases freely before the surface density measurements will be even approximately correct. If the average density of the electrolyte throughout the cell can be measured it will give an accurate indication of the state of charge regardless of the inhomogeneity in density.

The invention herein described and claimed provides a means of measuring the mean density of a liquid between any two given levels, wherein the readings are taken continuously and may be indicated on a meter at a distance from the point of measurement.

With the above and other objects in view, this invention consists in the construction, combination and arrangement of parts as will be described more fully hereinafter.

Reference is to be had to the accompanying drawing forming a part of this specification, wherein like reference characters indicate corresponding parts throughout the several views, and in which:

Fig. 1 is a view partly in section, showing an application of the invention and

Fig. 2 is a sectional view of a terminus of a tube used in the invention.

Referring more particularly to the drawing, 5 indicates a receptacle containing a liquid the density of which is to be measured by the apparatus now to be described.

Two tubes 6 and 7 are submerged in the liquid 8 and held in fixed positions relative to the receptacle 5 by any suitable means so that their submerged ends are at different levels, between which the mean density of the liquid is to be measured. Tube 6 is substantially an inverted U-tube and preferably has its end 9 arranged in parallelism with the sides of the receptacle. The tube 7 is somewhat of an inverted V-shape, its unsubmerged end being enlarged to provide a reservoir 10 for the reception of liquid 11, preferably colored. The leg 9 of tube 6 extends into the liquid 11 which rises and falls within the leg 9 as the difference in pressures in the submerged legs of tubes 6 and 7 varies. A suitable scale 12 is arranged adjacent the leg 9 whereby readings may be taken of the height of the liquid in the leg. Each of the tubes is provided with a valve 13 and 14, respectively, through which air or gas is pumped into the tubes to completely fill them until it bubbles out into the liquid in the receptacle.

In practical use of the invention it is desirable to employ tubes of small cross-section and to enlarge their ends to form broad cup-shaped mouths 15. By constructing the ends of the tubes in this manner, changes in the volume of gas or air in the tubes due to temperature changes or changes in pressure over the liquid will cause small fluctuations in the liquid level at these points and eliminate the necessity of pumping gas into the tubes at frequent intervals.

When gas bubbles are continually rising through the liquid, as in the case of an electric storage battery cell, it is unnecessary to have an external supply of gas. In such a case the cups at the lower ends of the tubes are so placed that the gas bubbles are collected by them and the cups are kept full at all times.

As a rule it is not of interest to measure densities down to zero, but to measure them to some prescribed lower limit. For example, it may be desired to measure the densities of solutions of salts in water, in which case the minimum density will be that of pure water. In the case of storage battery cells, the minimum density when it is completely discharged is usually about 1.100. Under these conditions it may be desirable to use a depressed zero monometer or pressure gage in order to eliminate the unused portion of the range from the scale of the meter.

The lower expanded ends of the tubes 6 and 7 are closed by flexible impervious membranes 16 and 17 to prevent the liquid from entering them. Tube 7 has an expansion chamber 18 at approximately the same level as the lower end of tube 6. The space above the membrane 17, and up to the approximate level of membrane 16, is filled with a liquid of a density equal to the minimum density of the liquid to be measured.

When the device is mounted on shipboard or other moving object, the apparatus should be constructed so that the liquid reservoir 11 is concentric with the vertical axis of the leg 9. If the axis of the apparatus is then fixed parallel to a line between the openings of the two tubes immersed in the liquid whose density is being measured, the readings of the apparatus will be unaffected by the roll or pitch of the ship, since the increase in sensitivity of the apparatus due to an inclined position will exactly compensate the decrease in pressure head in the tubes due to this inclination.

Although the above description has illustrated the use of the device for the measurement of the densities of liquids, it will be understood that the device is equally applicable to the measurement of the densities of gases with only a slight modification in construction.

It will be understood further that the above description comprehends only the general and preferred embodiment of my invention, and that various changes therein may be made within the scope of the appended claim without sacrificing any of the advantages of my invention.

The invention described herein may be manufactured and used by or for the Government of the United States of America for governmental purposes, without the payment of any royalty thereon.

What I claim as new is:

In combination with a receptacle containing a fluid whose mean density is to be measured, a measuring apparatus including a plurality of tubes having their ends submerged in said fluid at different levels, cup-shaped mouths on said ends, impervious membranes covering the mouths, an expanded portion in one of said tubes at approximately the same level as the lower end of the other tube, the space between the mouth and the expanded portion being filled with a liquid of a density equal to the minimum density of the fluid to be measured, a reservoir formed on the exposed end of said tube adapted to hold a colored liquid, an end of the said other tube being submerged in the liquid in the reservoir whereby the colored liquid will rise and fall in the said other tube with differences in pressures in the tubes, and a scale adjacent said other tube to indicate the height of the colored liquid therein.

DONALD L. HAY.